US008208133B2

(12) United States Patent
Minin et al.

(10) Patent No.: US 8,208,133 B2
(45) Date of Patent: Jun. 26, 2012

(54) BANKNOTE VERIFICATION DEVICE

(75) Inventors: Petr Valer'evich Minin, Moscow (RU); Dmitry Gennadievich Pis'Menny, Moscow (RU)

(73) Assignee: Obshhestvo S Organichennoj Otvetstvennost'Ju Konstruktorskoe Bjuro "Dors", Moscow (RU)

(*) Notice: Subject to any disclaimer, the term of this patent is extended or adjusted under 35 U.S.C. 154(b) by 0 days.

(21) Appl. No.: 13/263,317

(22) PCT Filed: Mar. 31, 2010

(86) PCT No.: PCT/RU2010/000145
§ 371 (c)(1), (2), (4) Date: Oct. 6, 2011

(87) PCT Pub. No.: WO2010/117302
PCT Pub. Date: Oct. 14, 2010

(65) Prior Publication Data

US 2012/0038906 A1 Feb. 16, 2012

(30) Foreign Application Priority Data

Apr. 10, 2009 (RU) ................................ 2009113463

(51) Int. Cl.
*G06K 9/74* (2006.01)

(52) U.S. Cl. ........................................................ 356/71

(58) Field of Classification Search ..................... 356/71
See application file for complete search history.

(56) References Cited

U.S. PATENT DOCUMENTS 5,034,616 A * 7/1991 Bercovitz ...................... 250/556
6,172,745 B1 * 1/2001 Voser et al. ..................... 356/71
2005/0217969 A1 * 10/2005 Coombs et al. ............... 194/206
2009/0022390 A1 * 1/2009 Yacoubian et al. ........... 382/135
2010/0259749 A1 * 10/2010 Zoladz et al. ................... 356/71

FOREIGN PATENT DOCUMENTS

| | | | |
|---|---|---|---|
| DE | 102004014541 | B3 | 5/2005 |
| EP | 1730500 | B1 | 7/2007 |
| GB | 2429767 | A | 3/2007 |
| RU | 2183350 | C2 | 6/2002 |
| RU | 2344481 | C2 | 7/2007 |
| RU | 2007109222 | A | 9/2008 |
| WO | WO 2004/104948 | A1 | 12/2004 |

OTHER PUBLICATIONS

International Search Report, mailing date Aug. 12, 2010, for corresponding International Application No. PCT/RU2010/000145, with English translation.

* cited by examiner

*Primary Examiner* — Michael P Stafira
(74) *Attorney, Agent, or Firm* — Intellectual Property Law Group LLP

(57) ABSTRACT

The invention relates to banknote verification devices that work using transmitted light. The claimed device has the technical result of uniformly illuminating the banknote that is being tested. The device comprises radiators (1), radiation receivers (3) situated on the opposite side of a banknote (2), and a light guide (4) which is situated between the radiators and the tested banknote and which is designed in the form of a tetrahedral prism with a trapezoidal base. One of the parallel side faces of the light guide (4) used as a radiation inlet face is oriented towards the radiators, while the opposite outlet face is oriented towards the surface of the banknote, all the other faces being light reflecting. The radiators (1) are disposed along the inlet face of the light guide (4) with equal intervals therebetween so that the sections of the outlet surface illuminated by adjacent radiators overlap. Furthermore, the first and the last radiators are mounted at a distance from the edge that is equal to half an interval.

20 Claims, 4 Drawing Sheets

BANKNOTE VERIFICATION DEVICE

CROSS-REFERENCE TO RELATED APPLICATIONS

This application is a U.S. National Phase application, under 35 U.S.C. §371, of International Application no. PCT/RU2010/000145, with an international filing date of Mar. 31, 2010, and claims benefit of Russian Application no. RU 2009113463 filed on Apr. 10, 2009; which are hereby incorporated by reference for all purposes.

FIELD OF INVENTION

The invention relates to the banknote verification devices using a transmitted light for detection.

BACKGROUND OF THE INVENTION

There is known a banknote verification device corresponding to patent No. RU2344481 (published 20 Jul. 2007, G07D7/12). The device has a linear light source and a linear sensor between which a banknote moves; a linear sensor registers the light emitted from the source and transmitted through the banknote. To provide a uniform illumination, there is used the Ulbricht cylinder with illumination devices (for example, light emitting diodes) as a light source and an additional imaging system. However, the efficiency of light transmission from the light sources to the banknote is less than 50%, and illumination intensity still tends to droop at the edges of the zone being registered. Low efficiency results from diffuse nature of the reflection in the Ulbricht cylinder and from a partial matching of the optical output of the cylinder with the optical input of the imaging system.

There is known the <<Banknote Identifier>> device in correspondence with invention application No. RU2007109222 (published 20 Sep. 2008, G06F1/00). This device includes the module of an optical radiation source; the above-mentioned module contains the definite number of packs of light emitting diodes with various wavelengths as well as the optical receiver module located on the opposite side of the banknote feed path and including the definite number of photodiodes between the banknote feed path and the module of the optical radiation source; in addition, the lens systems are placed between the feed path and the optical receiver module. According to this solution, each lens provides illumination of one round area of the banknote. Inspection is conducted in one or several banknote zones orientated in the direction of the banknote movement along the path. This ensures simplicity and cheapness of the device; but to conduct a quality verification of the banknote moving along the path, one needs information about light transmission through the whole surface of the banknote which may be obtained only with uniform illumination along its entire width. To meet this requirement (according to the known invention), the device needs a large number of light emitting diode packs and lenses; as a result, it loses its design simplicity and its cost rises.

INVENTION DISCLOSURE

Technical result of the claimed device is ensuring of uniform illumination of the banknote that is being verified.

The claimed technical result is achieved thanks to the following: there is a beam waveguide between the radiation sources and the banknote being verified in the banknote verification device containing radiation sources (at least of one wavelength) and the receivers of this radiation located on the side opposite to the banknote being verified; the above-mentioned beam waveguide provides radiation transmission from the light sources to the banknote surface. It is a four-sided prism with a trapezoid base, one of its parallel lateral sides (which is a radiation input) faces the radiation source and its opposite output side faces the banknote surface; all the other sides are light reflecting, location of the radiation sources (with an equal spacing between them) along the input face is symmetrical in relation to its center line, with overlapping of the output surface areas illuminated by the adjacent radiation sources. In this case, the distance from the edge at which the first and the last are installed is half of the spacing.

The distance between the radiation sources in the banknote verification device may be chosen from the criterion that the radiation power density of each radiation source that is measured on the output surface at the point located at the shortest distance from any of the adjacent light sources is twice as much as the density at the point equally spaced from them and located on the plane coming through the center lines of the input and output faces of the beam waveguide.

An optical system may be placed in the banknote verification device between the radiation receivers and the banknote being verified.

A light diffuser may be places in the banknote verification device between the beam waveguide and the banknote being verified.

The radiation sources in the banknote verification device may be composite, in the form of the clusters of light emitting diodes. Moreover, these clusters may consist of the light emitting diodes located on the straight line connecting the adjacent radiation sources in such a way that for any light emitting diode not located in the cluster center there is a light emitting diode located symmetrically in relation to the cluster center and this diode emits the same wavelength.

The light emitted by the light sources to the banknote is transmitted by the beam waveguide which is a four-sided prism whose lateral faces determine a longitudinal size (the length) of the beam waveguide, and the form of its cross section determine its thickness and width. Location of the beam waveguide is transverse to the direction of the banknote movement and it completely embraces the banknote width. The cross section of the beam waveguide is trapezoidal so that two opposite lateral sides of the prism are parallel and transmit light radiation; one of them faces the light sources and the other—the banknote. Two other lateral sides are either parallel or at some angle to each other and are light reflecting as well as the end surfaces of the beam waveguide. Such a beam waveguide design provides reflection of radiation emitted by each radiation source from all the prism sides except the input and the output ones.

The light getting into the beam waveguide undergoes a multiple reflection before it reaches the output face of the beam waveguide. In the longitudinal cross-section of the beam waveguide that is perpendicular to the banknote movement direction, the light passes from the light sources to the output face almost without any reflection. In the given plane, radiant flux from each radiation source expands considerably before achieving the output face; in this case the radiant fluxes from the adjacent light sources overlap when they reach the banknote and ensure a continuous illumination area on the total banknote width. Illumination uniformity at the banknote edges is ensured by placing the end light sources at the distance equal to half of spacing S between the radiation sources. As the end faces of the beam waveguide are also light reflecting, reflection from them creates virtual images of the light sources located on the same axis as the real radiation sources.

Ensuring the value of radiation power density from each radiation source measured on the output surface at the point located at the shortest distance from any of the adjacent light sources to be twice as much as the value measured at the point equally-spaced from them and located on the plane coming through the center lines of the input and output faces of the beam waveguide makes it possible to optimize the distance between the radiation sources depending on their technical parameters, because at the point between two adjacent radiation sources summation of the power density of the radiation from these adjacent sources occurs. This ensures flattening of the amplitude of periodically changing illumination depending on the distance from the radiation source.

The transmitting optical system may be installed between the receiver and the banknote to increase imaging resolution of the banknote optical image.

An additional light diffuser installed between the beam waveguide and the banknote increases a diffuse scattering of radiation and improves illumination uniformity.

When light sources in the form of composite clusters of light emitting diodes are used, registering of the banknote optical image at radiation with a different wavelength becomes possible; in this case, a symmetrical placing of the light emitting diodes in the clusters ensures illumination uniformity with any connection diagram of the light emitting diodes.

DETAILED DESCRIPTION OF SPECIFIC EMBODIMENTS

Figure 1:
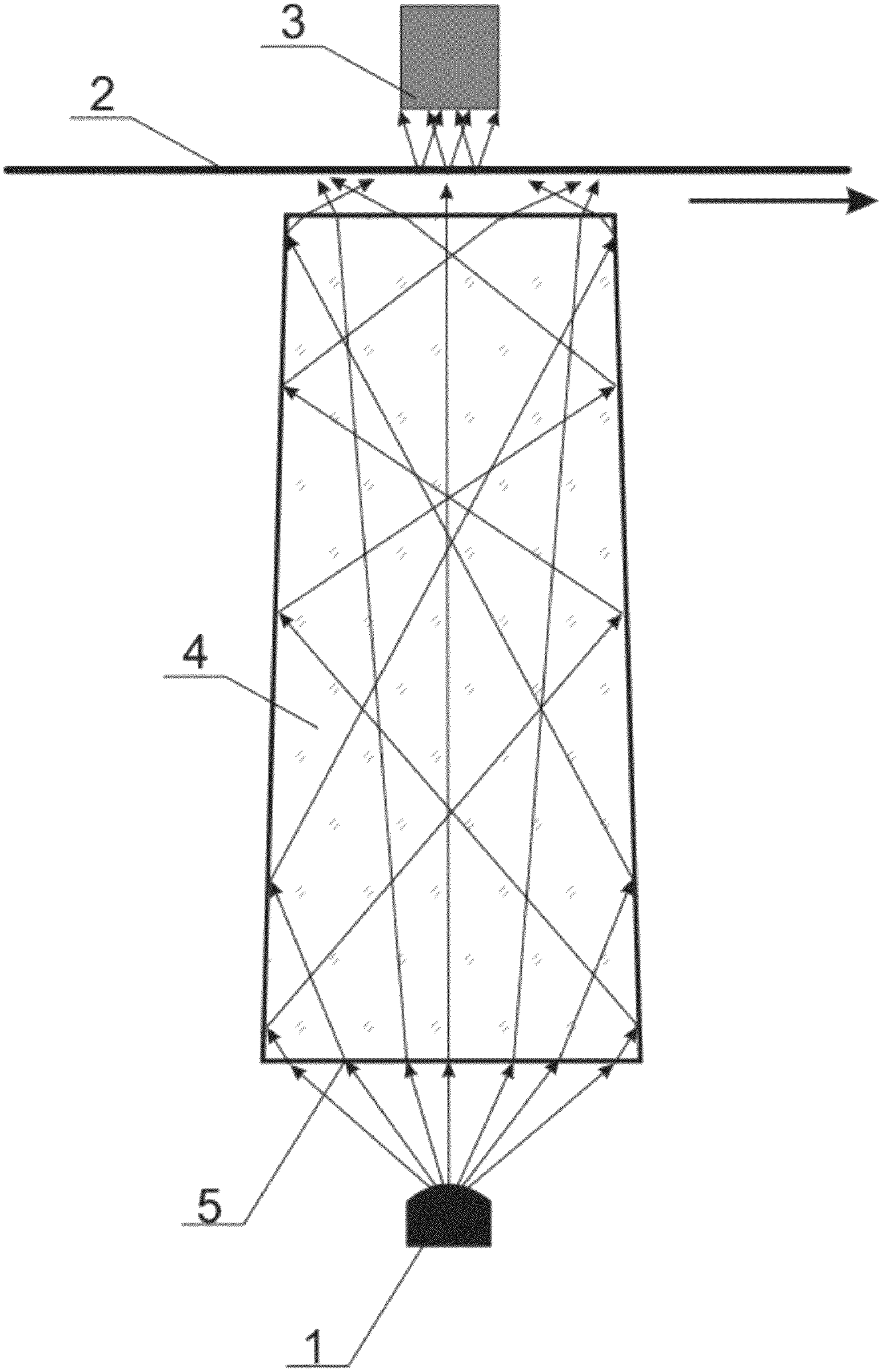
FIG. 1—is a diagram of light transmission in the longitudinal section of the beam waveguide.
Figure 2:
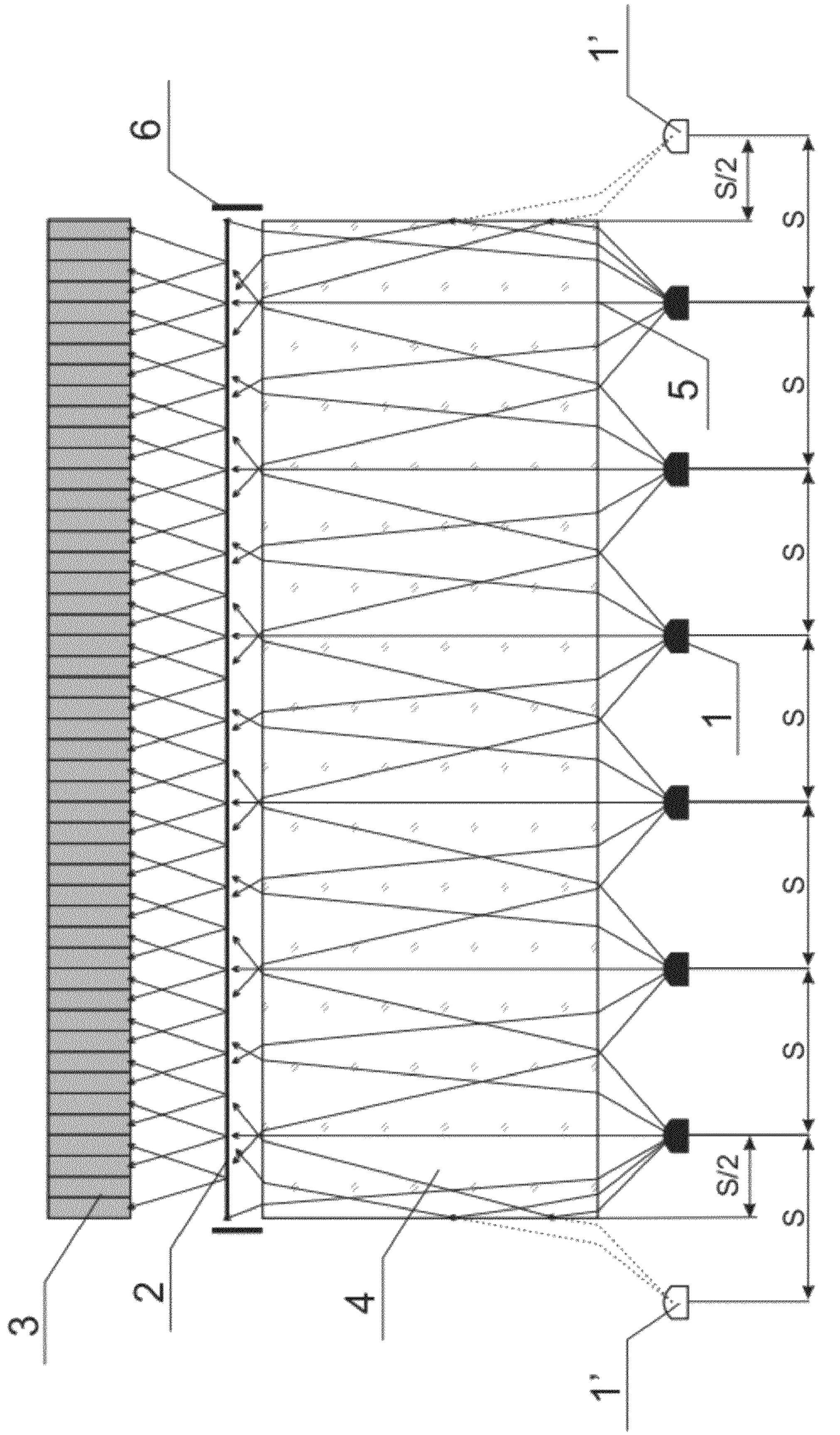
FIG. 2—is a diagram of light transmission in the transverse section of the beam waveguide.

The banknote verification device includes radiation sources 1 that illuminate banknote 2 which is being verified, and radiation receivers 3 located on the opposite side of banknote. The transportation mechanism (not shown in the figure) is moving a banknote along path 6 as indicated by the arrow. Beam waveguide 4 is placed between banknote 2 and radiation sources 1. The light emitting diodes able to emit at least at one wavelength are used as light sources 1; the sources are located along input face 5 of beam waveguide 4, along its center line with spacing S. To ensure uniform illumination of banknote surface 2, the light emitting diodes 1 are located keeping in mind the radiation distribution pattern of the light emitting diodes. The distance between the input surface and the output one as well as spacing of light sources S are the parameters to be optimized. When the distance between the input surface and the output one of beam waveguide 4 increases so that the width of illumination area from one source covers the whole output surface, the total illumination from all the sources on the output surface will be practically constant. But such an increase of beam waveguide 4 results in increase of the overall dimensions of the entire device. Another method is to increase the number of light sources 1 and decrease in distance S between them. If this method is used, a high level of uniformity may be achieved due to increase in overlapping of the illumination areas from adjacent light sources 1. But this method leads to a sharp rise of the device price with the growth of the uniformity required.

Figure 3:
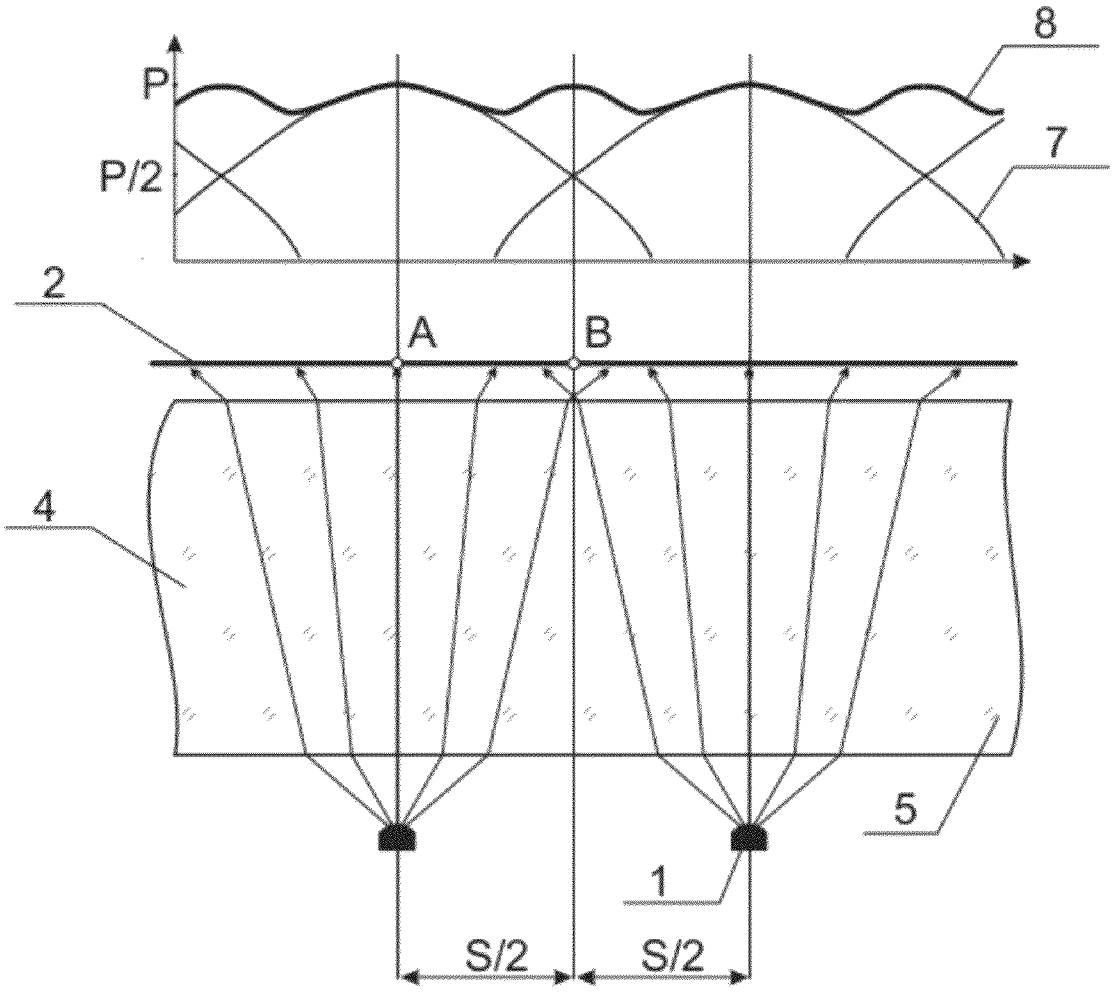
FIG. 3—illustrates a pattern of radiation power distribution on the banknote surface.

A broad range of light emitting diodes has an ellipsoid radiation distribution pattern. Selection of the optimal arrangement spacing of light sources 1 makes it possible to increase illumination uniformity of the area under test of banknote 2 without a significant increase in the overall dimensions of beam waveguide 4 and the number of light sources 1. FIG. 3 shows implementation of a preferable arrangement variant of light sources 1. Spacing S between radiation sources 1 is selected on condition that the radiation power density of each radiation source 1 measured on the banknote surface at point A located at the shortest distance from any of the adjacent light sources is twice as much as at point B equally-spaced away from them and located on the plane passing through the center lines of the input and output faces of the beam waveguide. Curve 7 corresponds to the radiation power density from one light emitting diode. If this condition is fulfilled, the radiation power density from two adjacent sources at the point equally-spaced from these radiation sources are summed and the sum is equal to the radiation power density at the point located at the minimal distance from the radiation source. Curve 8 in FIG. 3 shows the total power density from the adjacent light emitting diodes. According to it, the total value of the radiation power density periodically changes along spacing S and has two maximums and two minimums. According to the calculations, an optimal arrangement of the light sources allows for the power density deviation of not more than ±5% from the average level. In this case, the optimal distance between the input surface and the output one turns out to be small and its value is a somewhat less than the value of spacing S of light sources 1.

The method for achieving illumination uniformity described above is based on the geometrical and energy relations expressed in exact terms. Deviations from an exact location of the light sources and from a specified geometric form of the beam waveguide and a standard radiation pattern that are inevitable in industrial production may deteriorate uniformity of illumination a little bit. However, this deterioration has a continuous nature depending on the values of manufacturing tolerances. Given the deviation limits, it is possible to make calculations and determine the illumination uniformity level achievable under specified production conditions.

According to the preferable embodiment, end radiation sources 1 are located at the distance of S/2 from end surfaces 6 of beam waveguide 4. Beam waveguide 4 is a four-sided prism. Its lateral faces directed to the radiation sources and to the banknote are light transparent, and the other faces, including end faces 6, are light reflecting. The light from light sources 1 passes through beam waveguide 4 with multiple internal reflections from the lateral faces and the end ones. Radiation reflection from end faces 6 creates virtual images 1' of light sources 1 (FIG. 1). Virtual images 1' of the light sources are located with the same spacing S as real radiation sources 1 and continue a row of the light sources on both sides beyond the path width. The light from virtual light sources 1' achieves the output surface of beam waveguide 4 and then the surface of banknote 2 as if it were emitted from an infinite row of light sources and passes through the infinite beam waveguide not limited by the prism bases. This way the illumination uniformity is provided at the banknote edges.

The light coming to the banknote from the beam waveguide is scattered diffusely. The diffused light emitted by the banknote surface reaches receivers 3. The light absorption by the ink layers on both sides of the banknote and by the elements in the banknote paper (a watermark, a metal thread)

results in different luminosity of the banknote areas. The receivers register this different luminosity of the banknote surface as a banknote optical image in the transmitted light.

If the requirements for the resolution of the banknote optical image are not high, receivers 3 may be made as a multi-element semiconductor line array closely located to the banknote surface. 2. Blurring of the banknote image is determined by the distance between the receiving surface of the line array and the banknote surface.

To increase the imaging resolution, an image-transmitting optical system may be installed between receivers 3 and banknote 2. This optical system may be made, for example, as an array of gradient-index microlenses. Similar optical systems (for example, of Cellfoc type) are well-known in the state of art.

Banknotes of some countries of the world are known to have transparent windows made of a transparent polymer film. There is no diffuse scattering when light is passing through such a window, and the beams continue going towards the receivers along the paths they went from the output surface of the beam waveguide. Due to this, illumination uniformity may be affected (which deteriorates the quality of imaging) when reaching photodetectors 3. To correct this phenomenon, an additional light diffuser may be placed between the output surface of beam waveguide 4 and banknote 2. In particular, it may be placed directly on the output surface of the beam waveguide.

To register the banknote optical image using different wavelengths, there could be used sources 1 radiating several wavelengths alternatively. This may be achieved, for example, by using the multiple-chip light emitting diodes in which several chips emitting at different wavelengths are closely spaced. In other implementation, the radiation source is made composite, as a cluster of several closely located light emitting diodes. In this case, the cluster center is taken for the radiation source position.

When a composite radiation source is used, the light emitting diodes are separate radiation sources. For the end radiation source, one of the light emitting diodes turns out to be closer to the prism base than the other. The virtual image of this source will correspondingly be located closer to the prism base than the virtual image of the other. This affects regularity of spacing of the real and virtual radiation sources which may somewhat deteriorate illumination uniformity at the banknote edges. If the size of the cluster is small in comparison with the spacing of light sources S, this phenomenon may be ignored.

Figure 4:
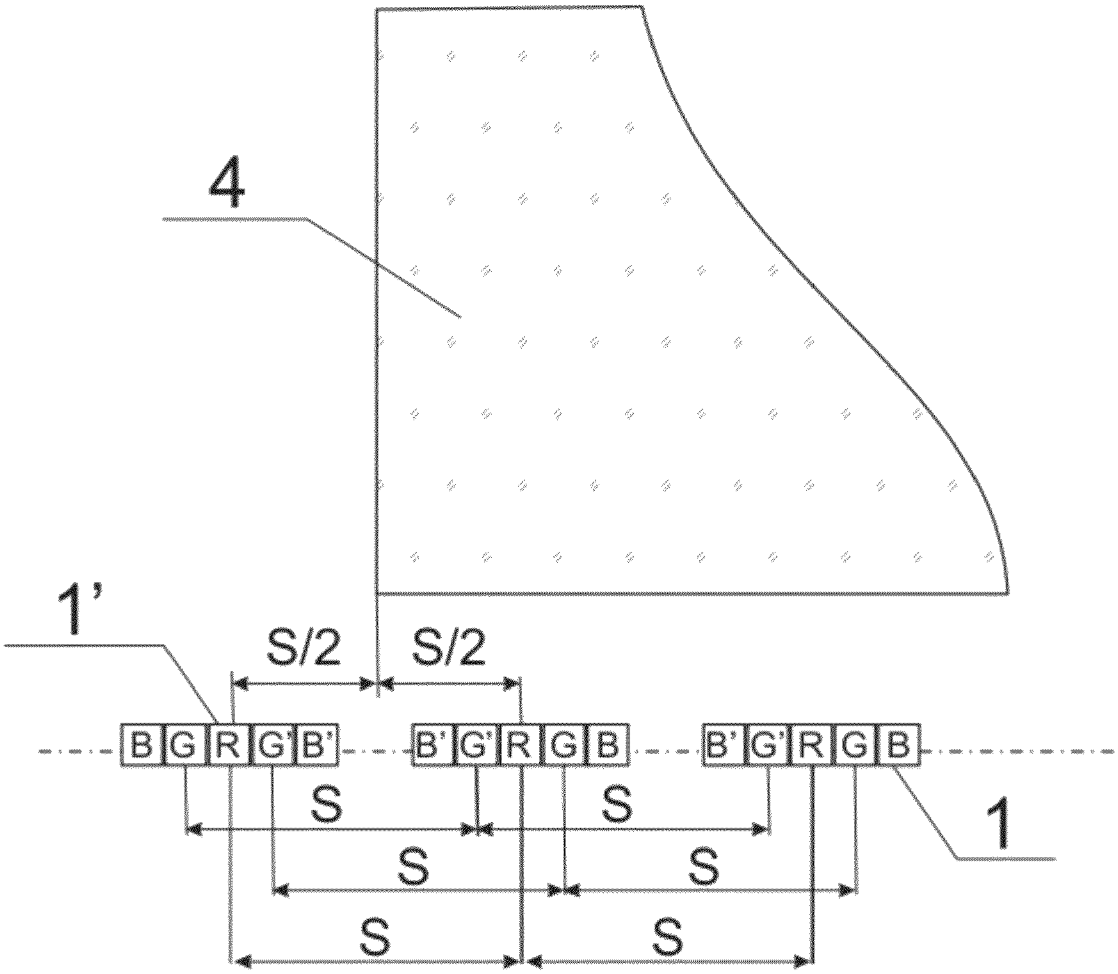
FIG. 4—illustrates location of the light emitting diodes in a cluster.

However, this effect may be completely avoided if the cluster and the positions of light emitting diodes different from the cluster center use at least two light emitting diodes emitting on the same wavelengths and located on the straight line connecting the adjacent radiation sources and symmetrically in respect to the cluster center, as FIG. 4 shows. For example, if the cluster uses light emitting diodes of red (R), green (G) and blue (B) colors, they may be placed on the straight line common for the light sources and at an equal distance from one another, in order BGRG'B'. A red light emitting diode is located in the cluster center and blue B and B' and green G and G' light emitting diodes are symmetrical in respect to the center. In this case, when being reflected by the prism base, virtual radiation source 1' will have location sequence of light emitting diodes B'G'RGB. So, both the real and virtual light sources of each of the three colors will follow with constant spacing S, and there will be no additional illumination uniformity at the banknote edges.

INDUSTRIAL APPLICABILITY

The claimed device may also be used for verification of other security protected documents basing on their optical image obtained in the transmitted light.

We claim:

1. A banknote verification device comprising:

a plurality of radiation sources of at least one wavelength;

a plurality of radiation receivers disposed on an opposite side of a banknote being verified;

a beam waveguide placed between the radiation sources and the banknote being verified, the beam waveguide providing light transmission from the radiation sources to a surface of the banknote, the beam waveguide shaped as a four-sided prism with a trapezoidal base; one of parallel lateral side faces of the beam waveguide, serving as an input face for radiation, is oriented towards the radiation sources while an opposite output face is oriented towards the surface of the banknote, all other side faces being light reflecting;

wherein the radiation sources are symmetrically disposed along the input face side of the beam waveguide having an equal spacing (S) distance therebetween, such that sections of the output face side illuminated by adjacent radiation sources overlap; wherein a first radiation source and a last radiation source are installed at a distance from an edge that is equal to half of the spacing (S) distance.

2. The device according to claim 1, wherein the spacing (S) distance between the radiation sources is chosen on condition that a radiation power density of each radiation source that is measured on an output surface at a point (A) located at a shortest distance from any of the adjacent light sources is twice as much as a density at a point (B), equally-spaced from the adjacent light sources and located on a plane coming through center lines of the input and output faces of the beam waveguide.

3. The device according to claim 1, wherein an optical system is disposed between the receivers and the banknote being verified.

4. The device according to claim 2, wherein an optical system is disposed between the receivers and the banknote being verified.

5. The device according to claim 1, wherein a light diffuser is disposed between the beam waveguide and the banknote being verified.

6. The device according to claim 2, wherein a light diffuser is disposed between the beam waveguide and the banknote being verified.

7. The device according to claim 3, wherein a light diffuser is disposed between the beam waveguide and the banknote being verified.

8. The device according to claim 4, wherein a light diffuser is disposed between the beam waveguide and the banknote being verified.

9. The device according to claim 1, wherein the radiation sources are made composite in a form of a cluster of light emitting diodes.

10. The device according to claim 2, wherein the radiation sources are made composite in a form of a cluster of light emitting diodes.

11. The device according to claim 3, wherein the radiation sources are made composite in a form of a cluster of light emitting diodes.

12. The device according to claim 4, wherein the radiation sources are made composite in a form of a cluster of light emitting diodes.

13. The device according to claim 5, wherein the radiation sources are made composite in a form of a cluster of light emitting diodes.

14. The device according to claim 6, wherein the radiation sources are made composite in a form of a cluster of light emitting diodes.

15. The according to claim 7, wherein the radiation sources are made composite in a form of a cluster of light emitting diodes.

16. The device according to claim 8, wherein the radiation sources are made composite in a form of a cluster of light emitting diodes.

17. The device according to claim 9, wherein the radiation sources that are made as a cluster containing the light emitting diodes, is located on a straight line connecting adjacent radiation sources in such a way that for any light emitting diode not located in a cluster center there is another light emitting diode located symmetrically in relation to the cluster center and the another light emitting diode emits the same wavelength.

18. The device according to claim 10, wherein the radiation sources that are made as a cluster containing the light emitting diodes, is located on a straight line connecting adjacent radiation sources in such a way that for any light emitting diode not located in a cluster center there is another light emitting diode located symmetrically in relation to the cluster center and the another light emitting diode emits the same wavelength.

19. The device according to claim 11, wherein the radiation sources that are made as a cluster containing the light emitting diodes, is located on a straight line connecting adjacent radiation sources in such a way that for any light emitting diode not located in a cluster center there is another light emitting diode located symmetrically in relation to the cluster center and the another light emitting diode emits the same wavelength.

20. The device according to claim 12, wherein the radiation sources that are made as a cluster containing the light emitting diodes, is located on a straight line connecting adjacent radiation sources in such a way that for any light emitting diode not located in a cluster center there is another light emitting diode located symmetrically in relation to the cluster center and the another light emitting diode emits the same wavelength.

* * * * *